(No Model.)

W. H. DODGE.
PULLEY.

No. 456,722. Patented July 28, 1891.

Witnesses:
J. B. McGivn.
W. E. Stearns.

Inventor:
Wallace H. Dodge
By his atty
R. D. O. Smith

United States Patent Office.

WALLACE H. DODGE, OF MISHAWAKA, INDIANA.

PULLEY.

SPECIFICATION forming part of Letters Patent No. 456,722, dated July 28, 1891.

Application filed August 7, 1886. Serial No. 210,291. (No model.) Patented in England October 12, 1886, No. 12,987.

*To all whom it may concern:*

Be it known that I, WALLACE H. DODGE, of Mishawaka, in the county of St. Joseph and State of Indiana, have invented new and useful Improvements in Band-Pulleys, (patented in England, October 12, 1886, No. 12,987;) and I do hereby declare that the following is a full and accurate description of the same.

This invention consists in an interchangeable or removable hub, whereby by removing one hub and substituting another the same pulley may be adapted to shafts of different sizes.

In Letters Patent No. 260,462, issued to me on the 4th day of July, 1882, a similar object is provided for by the employment of bushes to be interposed between the hub and the shaft, the hubs being all bored to standard sizes and the bushes being bored to the size of the required shaft; but, as will be apparent, the employment of bushes is not always desirable, because, being an extra and interposed part, it is necessarily an element of weakness, although it is convenient and satisfactory in many cases.

The object of my present improvement is to avoid the necessity for boring the hub larger than the shaft, and thereby weakening it, and at the same time to retain the advantage of an interchangeable center, so that any pulley may without trouble be fitted to any shaft.

My invention therefore consists in a pulley having arms capable of yielding at the center, provided with removable angular hub-blocks seated in said arms, and straining-bolts to draw the arms and hub-blocks toward each other to clamp the same firmly on the shaft.

Figure 1:
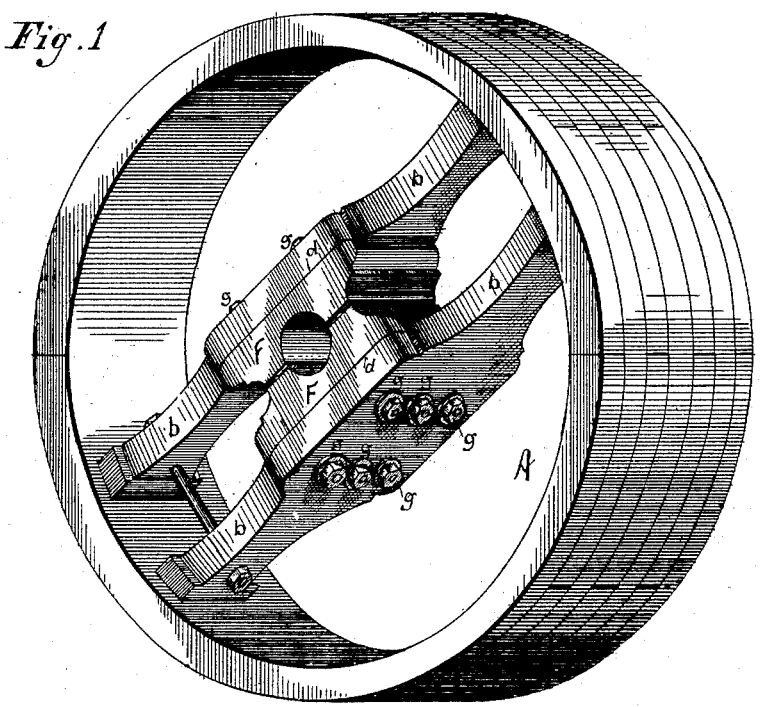
Figure 2:
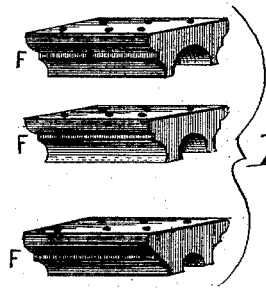
Figure 3:
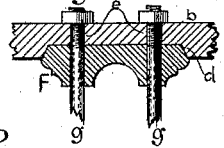
Figure 5:
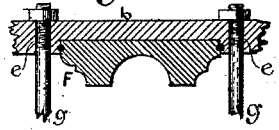
Figure 4:
Figure 6:

In the accompanying drawings, Figure 1 is a perspective view of my pulley. Fig. 2 is a perspective view of several center blocks bored for shafts of different sizes. Figs 3, 4, and 5 represent modifications. Fig. 6 is a perspective view of my center block detached.

A is the pulley with its rim and the arms $b$, attached to said rim permanently at their ends. Each arm $b$ has a broad groove $d$ cut across its middle, and holes $e$ are provided for sufficient number of clamping-bolts $g$. The groove $d$ is the seat for the hub-blocks F, which, when heretofore used, have been glued in and thereby rigidly attached and incorporated in the arm. I now propose to leave them unattached and removable, but so accurately fitted to their seats that they may be removed, replaced, and interchanged without disturbing the balance or axial truth of the hub and pulley. The hub F may be fitted to the groove $d$ with a square joint, or said groove may be inclined in one direction or the other, so as to make a taper-seat, as shown in Fig. 3, or a dovetailed connection, as shown in Fig. 4, or it may be keyed, as shown in Fig. 5. The dovetailed connection and the keys are simply conveniences for attaching the hub-block to the arm and do not add any element of strength. For general purposes the taper-seat shown in Fig. 3 is preferred, as it insures a tight joint and permanency of position. It may be useful, when it is necessary, to work the shaft up near to its full capacity to make the hub longer than the pulley-face is wide, so as to obtain longer gripping-surface on the shaft. In that case the hub-box may have on its back cross-grooves $h$ to interlock with the grooves $d$. The clamping-bolts $g$ may pass down through the arms and through the hub-blocks, or may pass down close to said hub-blocks, as preferred.

Having described my invention, I claim—

1. In a pulley, a rim provided with spoke-arms rigidly attached at their ends to said rim and capable of yielding at the middle, combined with angular removable hub-blocks seated on said arms and bored to fit a shaft, and straining-bolts whereby said arms and blocks may be drawn toward the center and clamped fast upon the shaft, as set forth.

2. In a pulley, a rim and two parallel spoke-arms rigidly attached at their ends to said rim, but capable of yielding at their middle, said arms being provided with flat seats, combined with removable angular hub-blocks adapted to fit said seats and bored to fit a shaft, and straining-bolts whereby said hub-blocks and arms are drawn toward the center and clamped upon the shaft, as set forth.

3. The rim and arms of a band-pulley, combined with removable hub-blocks F and clamping-bolts, which are caused to pass through said arms and the margins of said blocks, as shown.

WALLACE H. DODGE.

Witnesses:
J. A. MACKINNON,
W. H. TRUVORGY,
J. A. MACKINNON, JR.